March 3, 1970   R. MOSER ETAL   3,498,592
HEAT FIXING APPARATUS FOR FUSIBLE MATERIAL
Filed May 24, 1968   6 Sheets-Sheet 1

INVENTORS
RABIN MOSER
FREDERICK W. HUDSON
BY
ATTORNEYS

INVENTORS
RABIN MOSER
FREDERICK W. HUDSON

BY

ATTORNEYS

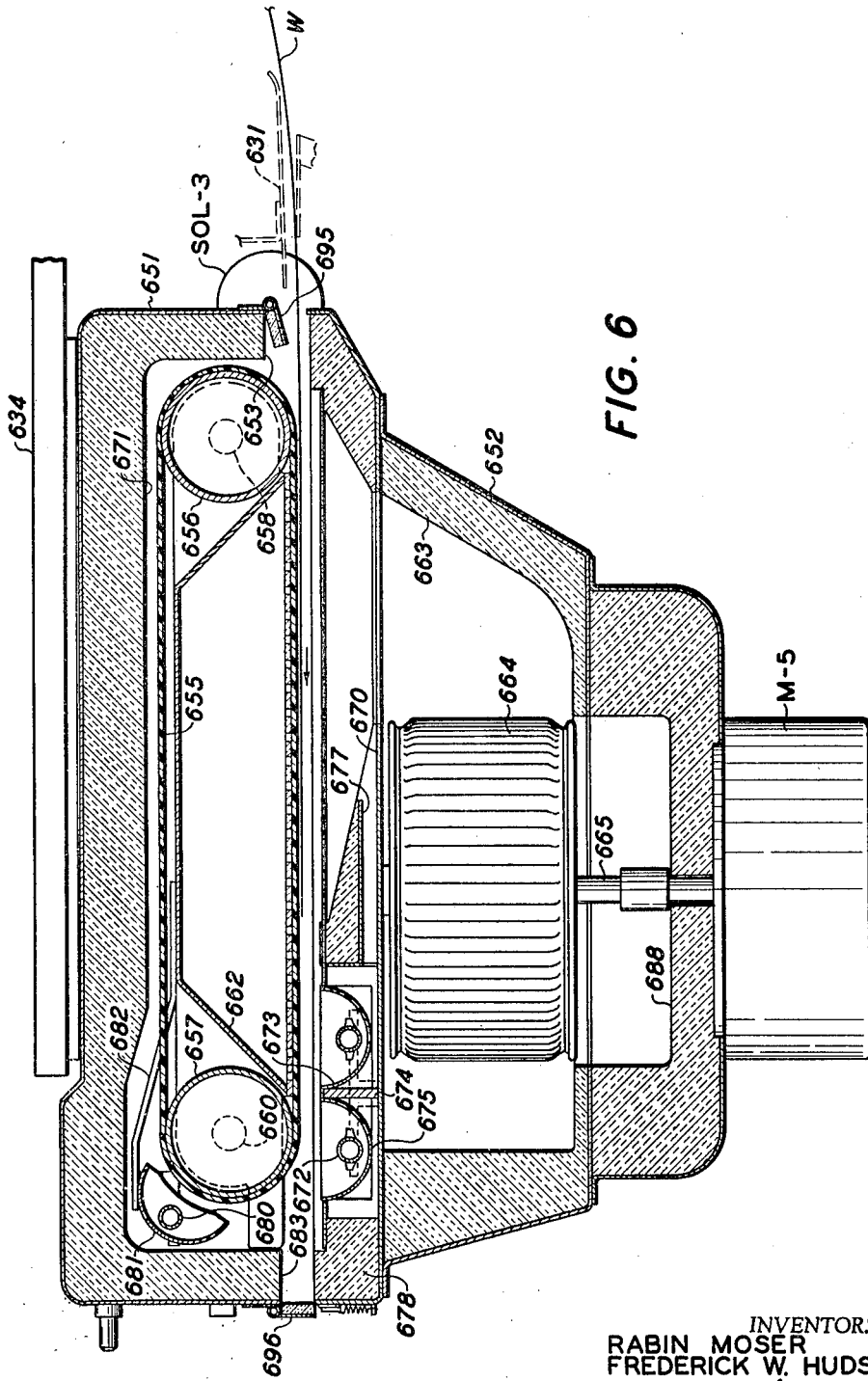

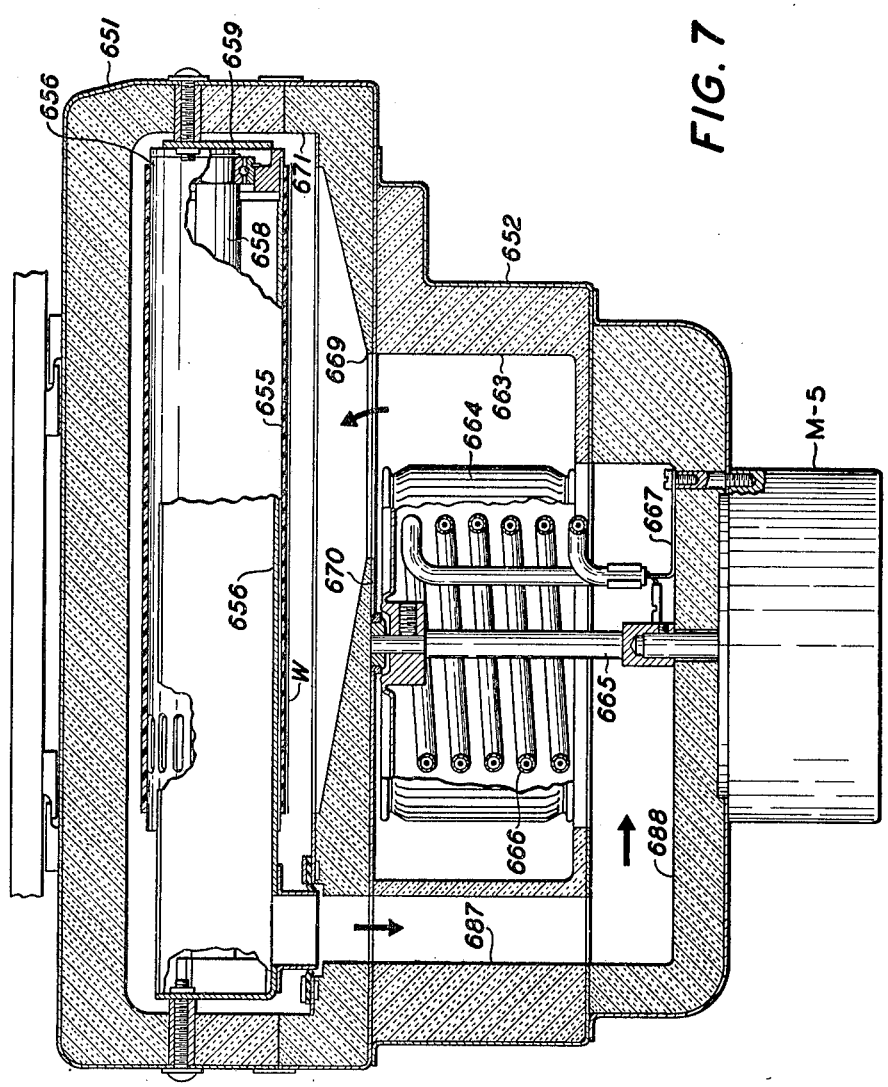

United States Patent Office 3,498,592
Patented Mar. 3, 1970

3,498,592
HEAT FIXING APPARATUS FOR FUSIBLE
MATERIAL
Rabin Moser, Fairport, and Frederick W. Hudson, West Henrietta, N.Y., assignors to Xerox Corporation, Rochester, N.Y., a corporation of New York
Filed May 24, 1968, Ser. No. 731,752
Int. Cl. F27b 9/06, 9/14; F27d 17/00
U.S. Cl. 263—6                                    7 Claims

ABSTRACT OF THE DISCLOSURE

A fixing system for fixing fusible material such as electroscopic material having a heating chamber with at least two heating devices arranged therein. One of the heating devices is adapted to heat support material carrying the fusible material by convection and the other device by radiant energy. Means are included for effecting the recirculation of re-heated air for the support material.

---

This invention relates to heat fixing systems, and particularly, to improvements in fuser apparatus for particulate material that is used in electrostatic automatic copiers/reproducers capable of high speed operation.

As is well known in recent years, the steadily increasing size of various industries has required an enormous increase in the amount of paper work that must be accomplished, maintained, and made available for wide interplant circulation. In the present day, dry commercial automatic copiers/reproduction machines, which are adapted to produce copies of between 5 and 60 8" x 11" sheets of copy per minute, the image fixing apparatus may be in the form of heated coils or, include heated pressure rollers to effect image fixing. The use of these devices seriously limit high speed copying or duplicating because they are inadequate for efficiently and effectively heating solid area images on fast moving support material.

As a solution for overcoming some disadvantages for high speed copying, the latest machine concept for copiers utilizes flash exposure of a document and the arrangement of a moving photoconductor material in the form of an endless belt. However, there has been no effective way in which to fix transferred powder images upon support material, such as sheet paper, for the relatively fast movement that the material experiences.

It is therefore the principal object of this invention to improve heat fixing apparatus for effecting maximum efficiency in the use of heat to fix developed images comprising particulate material placed upon support material such as paper or the like.

Another object of this invention is to utilize the combination of the convection and radiation of heat to effect the fusing of particulate toner material.

Another object of this invention is to utilize a re-heat recirculating system to fuse toner particles in image configuration.

These and other objects of this invention are obtained by means of a first heating device in the form of a heater coil and fan arranged to direct heated air on a support material as the same enters the chamber within a fuser housing and, a second heating device in the form of heat-radiating lamps for heating to a final fused condition the now tackified toner image. An air circulating system is also provided for effecting recirculation of the heated air thereby minimizing the power necessary to maintain continuously the temperature of the air for continuous high speed fusing.

For a better understanding of the invention as well as other objects and further features thereof, reference is had to the following detailed description of the invention to be read in conjunction with the accompanying drawings, wherein:

FIG. 6 is a sectional view taken along the line 6—6 in FIG. 5;

FIG. 7 is a sectional view taken along line 7—7 in FIG. 4;

Figure 1:
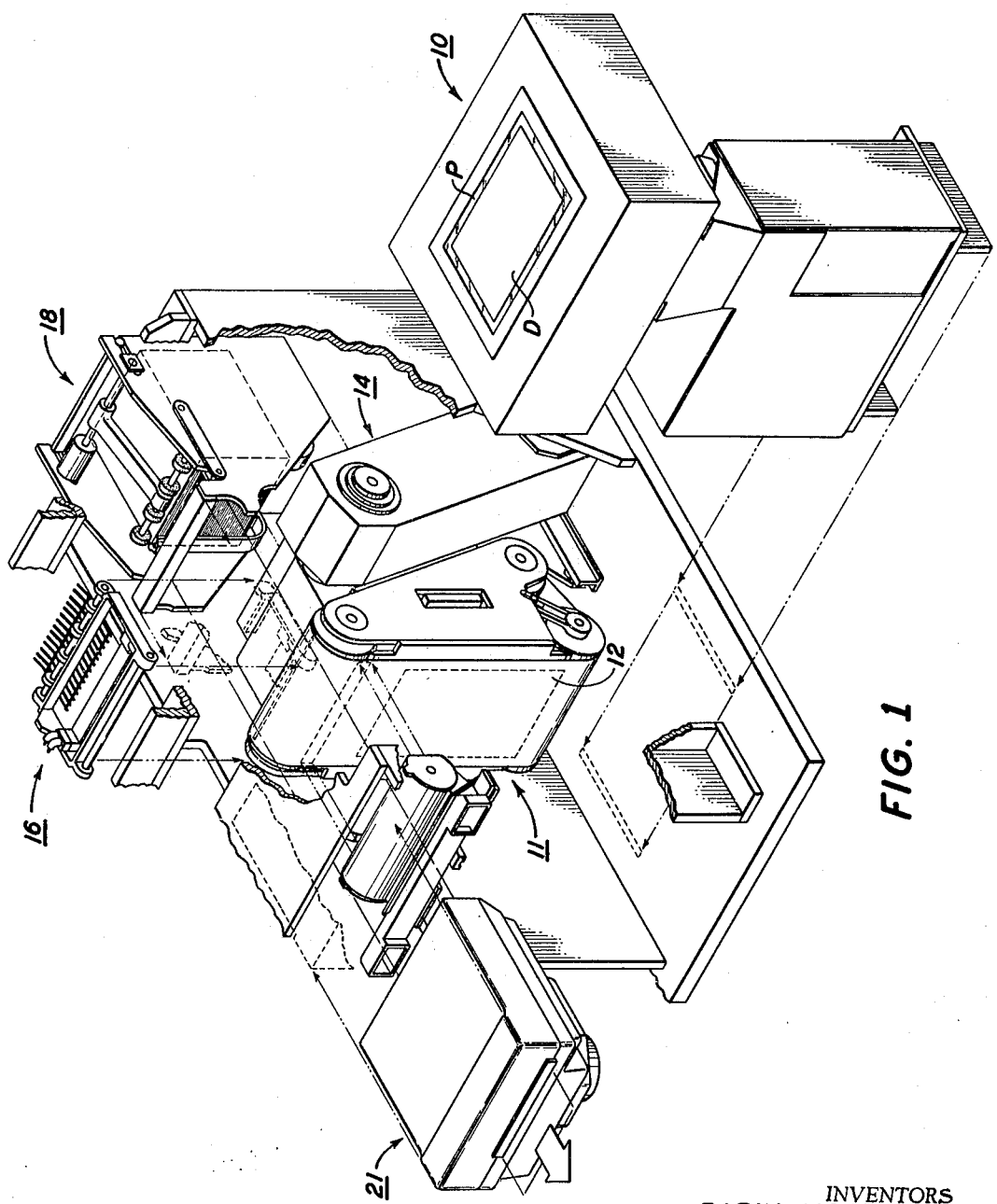
FIG. 1 is an exploded right-hand perspective view of a reproduction machine incorporating the present invention therein with the processing components separated to better illustrate the environment for the present invention.
Figure 2:
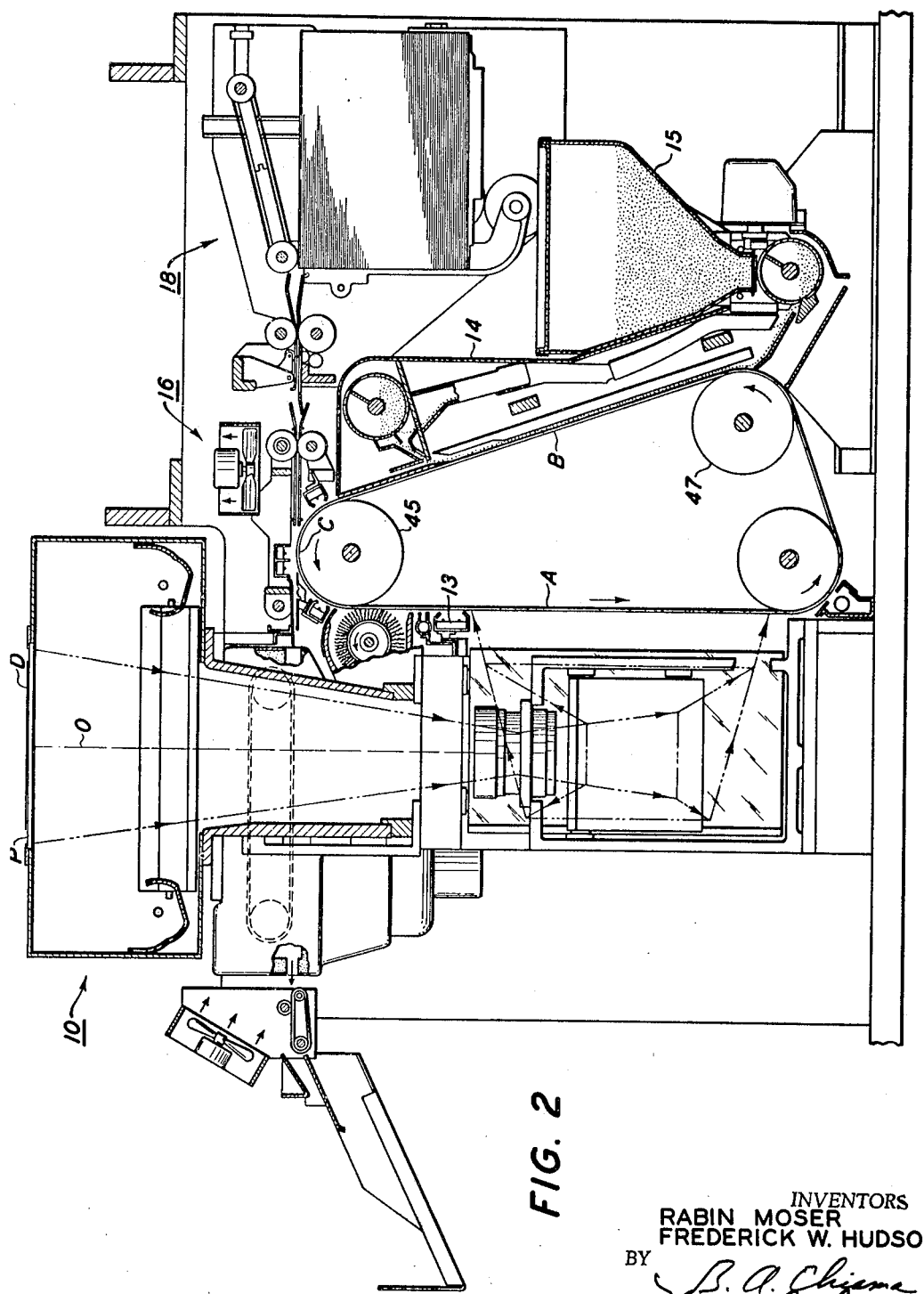
FIG. 2 is a schematic sectional view of the reproduction machine showing the various processing stations.
Figure 3:
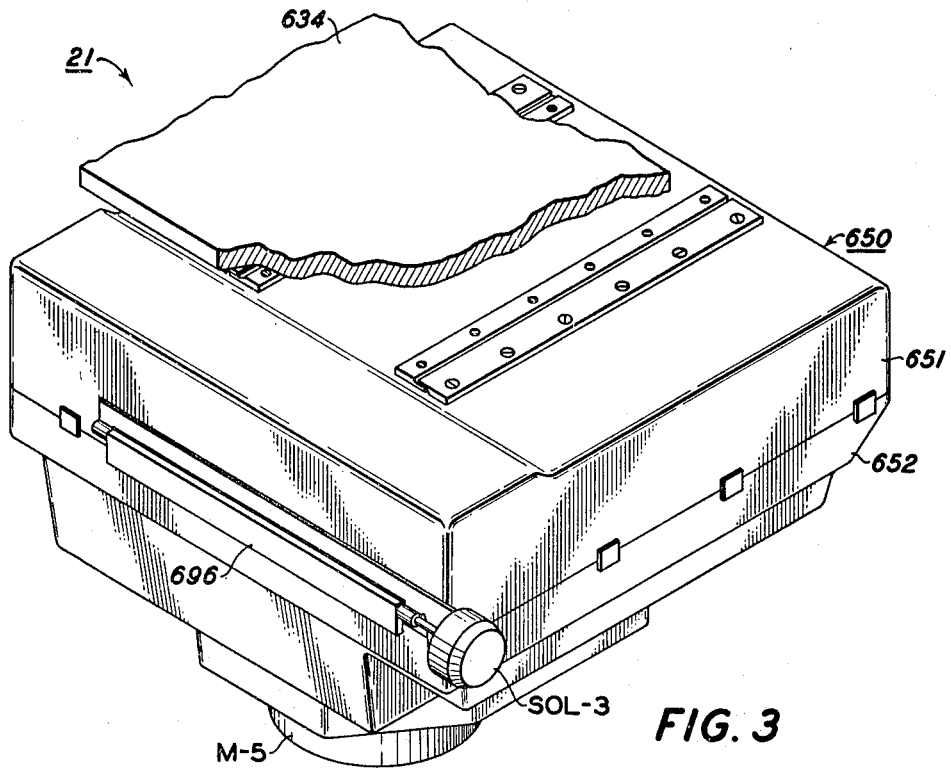
FIG. 3 is a perspective view of the fuser assembly utilized in the machine.
Figure 8:
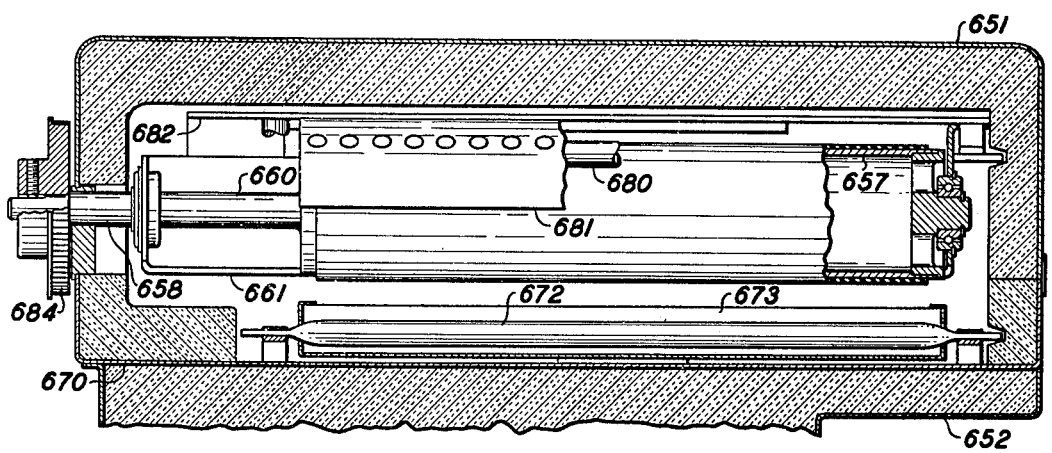
FIG. 8 is a sectional view of the fuser housing taken along line 8—8 in FIG. 4.
Figure 4:
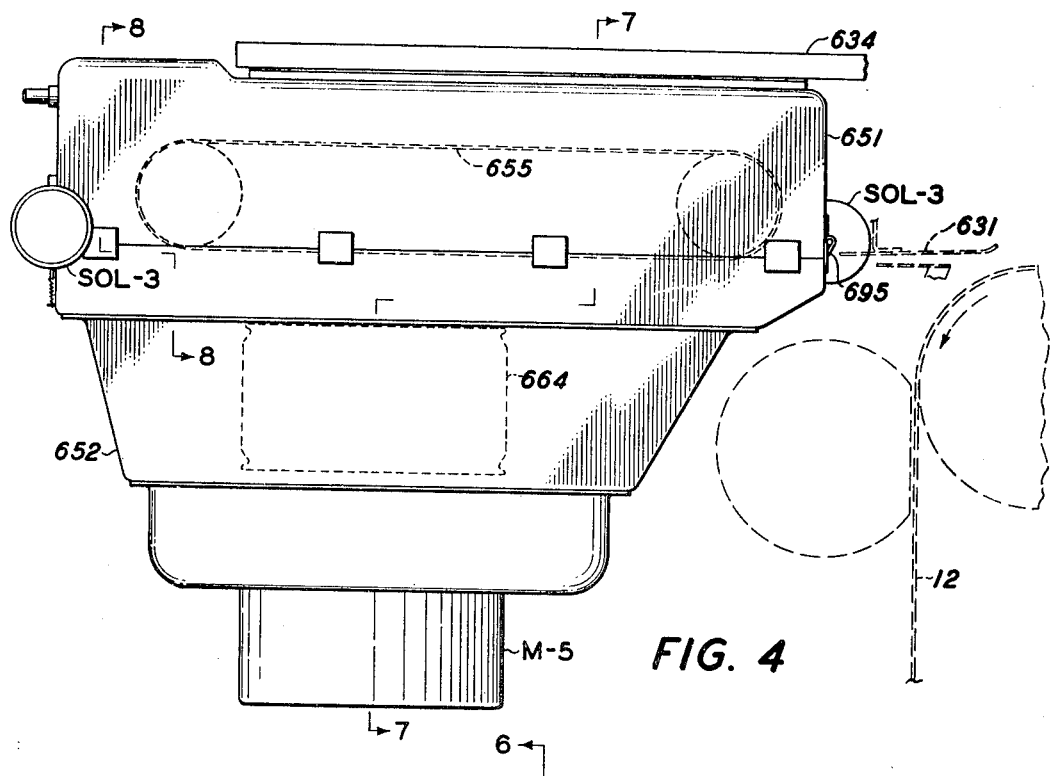
FIG. 4 is an elevational view of the fuser assembly as seen from the front of the machine.
Figure 5:
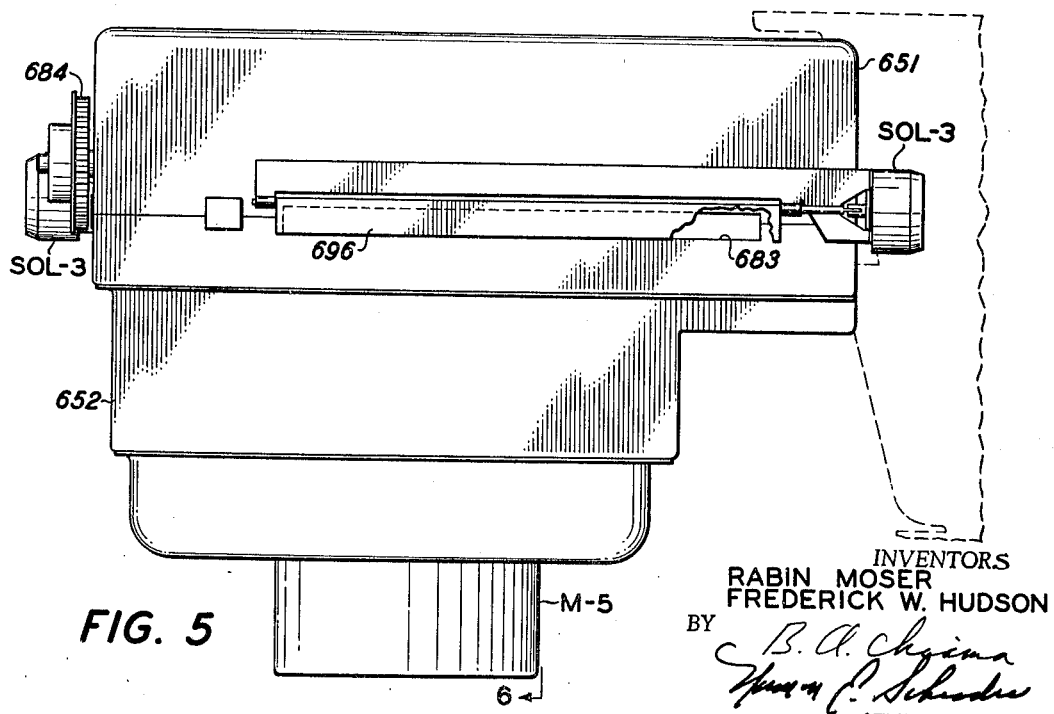
FIG. 5 is an end view of the fuser assembly as seen from the output side of the assembly.

For a general understanding of the illustrated copier/reproduction machine, in which the invention may be incorporated, reference is had to FIGS. 1 and 2 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it is fused by a fusing device whereby the powder image is caused permanently to adhere to the support surface.

In the illustrated machine, an original to be copied is placed upon a transparent support plate P fixedly arranged in an illumination assembly generally indicated by the reference numeral 10, arranged at the left end of the machine.

While upon the platen, an allumination system flashes light rays upon the original thereby producing image rays corresponding to the informational areas on the original. The image rays are projected by means of an optical system for exposing the photosensitive surface of a xerographic plate in the form a flexible photoconductive belt arranged on a belt assembly generally indicated by the reference numeral 11.

The photoconductive belt assembly 11 is slidably mounted upon a support bracket secured to the frame of the machine and is adapted to drive a selenium belt 12 in the direction of the arrow as shown in FIG. 2 at a constant rate. During this movement of the belt, the reflected light image of an original on the platen is flashed upon the xerographic surface of the belt. The belt surface that intercepts the light rays comprises a layer of photoconductive material such as selenium on a conductive backing that is sensitized prior to exposure by means of a charging corona generator device indicated at 13.

The flash exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a developing station B in which there is positioned a developer assembly generally indicated by the reference numeral 14 and where the belt is maintained in a flat condition. The developer assembly 14 comprises horizontally and vertically conveying mechanisms which carry developing material to the upper part of the belt assembly 11 whereat the material is dispensed and directed to cascade down over the upwardly moving inclined selenium belt 12 in order to provide development of the electrostatic image.

As the developing material is cascaded over the xerographic plate, toner particles in the development material are deposited on the belt surface to form powder images. As toner powder images are formed, additional toner particles are supplied to the developing material in proportion to the amount of toner deposited on the belt during xerographic processing. For this purpose, a toner dispenser generally indicated by reference numeral 15 is used to accurately meter toner to the developer material in the developer assembly 14.

The developer electrostatic image is transported by the belt to a transfer station C whereat a sheet of copy paper is moved at a speed in synchronism with the moving belt in order to accomplish transfer of the developed image. There is provided at this station a sheet transport mechanism generally indicated at 16 adapted to transport sheets of paper from a paper handling mechanism generally indicated by the reference numeral 18 to the developed image on the belt at the station B.

After the sheet is stripped from the belt 12, it is conveyed into a fuser assembly generally indicated by the reference numeral 21 wherein the developed and transferred xerographic powder image on the sheet material is permanently affixed thereto. After fusing, the finished copy is discharged from the apparatus at a suitable point for collection externally of the apparatus.

Suitable drive means may be arranged to drive the selenium belt 12 in conjunction with timed flash exposure of an original to be copied, to effect conveying and cascade of toner material, to separate, and feed sheets of paper and to transport the same across the transfer station C and to convey the sheet of paper through the fuser assembly in timed sequence to produce copies of the original.

It is believed that the foregoing description is sufficient for the purposes of this application to show the general operation of an electrostatic copier using an illumination system constructed in accordance with the invention. For further details concerning the specific construction of the electrostatic copier, reference is made to copending application Ser. No. 731,934 filed concurrently herewith, on May 24, 1968, in the name of Hewes et al.

As shown in FIGS. 3–8 the fuser apparatus 21 is of the oven type and includes a main housing 650 formed with an upper section housing 651 in communication with the interior of a lower section housing 652 and, an electric motor M–5 for maintaining circulation of the heated air within the fuser housing 650. The walls of the sections 651 and 652 are preferably made from thick heat insulating material for minimizing heat losses through the walls.

Direct fusing of a particulate toner image on the lower surface of a sheet of paper W is achieved by forwarding the sheet bearing the powder image to be fused through a slot 653 formed in the wall of the upper housing 651 by means of the guide plates 631 on the transport 16. As shown in FIG. 6 the plates 631 extend to the slot 653 and the sheet W is adapted to bridge across the fuser end of the strips 631 until the leading edge of the sheet is picked up by the conveyor system for the fuser 21. The fusing occurs while the sheet W is transported through the upper fusing housing 651 by virtue of the convection and radiation and to a limited extent, some conduction of heat during the paper travel.

The conveying system for the fuser apparatus comprises a relatively wide, single endless belt 655 having a width greater than the width of a sheet of paper being conveyed thereby. The belt is formed with many small apertures and is arranged to be driven around two rollers 656, 657 mounted transverse to the paper travel. The roller 656 is arranged at the input section of the fuser or adjacent the entrance slot 653 in order to present to the belt 655 the leading edge of a sheet of paper entering the fuser housing.

The roller 656 is supported on a shaft 658 supported by bearings mounted on each end of a U-shaped support device 659 secured to the outer walls of the housing 651. The other support roller 657 for the conveyor belt 655 is supported for rotation upon a shaft 660 mounted at one end in a bearing secured to one end of a U-shaped support device 661 and, at the other end to a suitable drive system.

As the sheet of paper bearing a transferred toner image enters the housing 651 it comes in contact with the moving belt 655 in an inverted condition. This is accomplished by means of a vacuum plenum 662 arranged between the two runs of the belt and adapted to provide a reduced pressure upon the lower run of the belt for lightly maintaining the sheet against the lower run to be carried thereby. The apertures formed in the belt 655 insures that there is a gradual flow of air from the space below the lower run of the belt toward the space between the runs of the belt.

As the sheet of paper enters the housing 651 and becomes positioned to be conveyed by the belt 655, successively moving portions of the inverted toner image are immediately influenced by a steady flow of hot air which is of sufficient temperature as to cause the toner particles to become tacky in this preheat condition. This preheat condition continues for most of the belt travel and is produced by a heating and conveying apparatus to be described below.

In the lower heating chamber 652 there is formed an inner chamber 663 into which is positioned a rotatable impeller 664 supported and driven by a drive shaft 665 arranged axially thereof and connected to a motor M–5 adapted to impart rotation to the impeller 664. Within the impeller 664 and arranged generally along the axis thereof and the shaft 665 is a heater coil 666 comprising relatively large diameter heat conducting material connected to a terminal 667 which in turn is connected to a suitable source of electrical power to be energized thereby.

The impeller 664 is provided with vanes arranged in a pattern such that upon rotation of the impeller, air will flow axially in toward the center space of the impeller vanes from the space below the impeller and than radially outwardly from the general direction of the axis of the impeller toward and through the impeller vanes. During energization of the motor M–5, air then is conveyed from within the internal space of the impeller where the air is continually heated by the coil 666 and then driven outwardly into the lower heating chamber 663. This air is conveyed out of the chamber 663 through an opening 668 formed in a separation wall 670 separating the chamber 663 within the housing 651 from a layer chamber 671 within the housing 651.

As the hot air under pressure leaves the chamber 663 and enters the chamber 671, it becomes slightly reduced since the chamber 671 is larger. This is effective to aid in directing heated air to the toner image on the sheet W that is under low pressure but of high volume and of sufficient temperature to preheat the toner particles in the image to the tacky condition referred to above. This flow of air also maintains the sheet of paper against the lower run of the belt 655. In this stage of heating of the toner image, the same is affected by convection type heating.

The second heating stage that the powder image on the sheet experiences is in the form of radiated heat produced by a pair of parallel arranged linear infrared heat lamps 672 arranged transverse to the paper travel. Slightly below the lower run of the belt 655 and in a position just before the belt moves out of conveying relationship with a sheet in traveling around the roller 657. The lamps 672 are arranged in side by side relationship and each is arranged at the focal point of concave reflectors 673. The adjoining edges of the reflectors are secured together and are supported by a strip of metal 674 secured at its lower edge upon the separation wall 670. The heat lamps 672 are preferably of the quartz infrared type which are capable of producing relatively high heat quickly. The reflectors 673 are formed with a plurality of small openings 675 which provide communication between the interior chambers for the reflectors and the space surrounding the outer confines of the reflectors, this latter space being connected by a narrow transversely extending passageway 677 formed in the lower wall 678 of the housing 651. Some of the air produced by rotation of the impeller 664 is conveyed by the passageway 677 and the openings 675 into the interior of the reflector 673 under a slight pressure in order to enhance the heating effect produced by the lamps 672. In addition, the heat produced by the lamps 672 is added to the heat produced by the coil 666 before being applied to the tackified image on the sheet W.

Throughout the time during which the sheet W is within the chamber 671 of the upper heating housing 651 and during the operation of the heating means produced by the heating coil 666 and the impeller 664 and the heat produced by radiation from the lamp 672, the sheet is continually heated to some extent by conduction on the upper surface thereof. This heating by conduction is produced by a quartz infrared lamp 680 mounted at the apex or focus line for a reflector 681 having a configuration similar to that of the reflectors 673 arranged to concentrate heat rays upon the belt 665 as the same commences its return run preparatory to the picking up of another sheet of paper. The lamp 680 and the reflector 681 are suitably mounted by a bracket 682 to the sides of the housing 651 in a position to heat the belt 655 while the same is being run on the roller 657. This heating of the belt has two functions, one to present a heated conveying means which will be in intimate contact with a sheet of paper entering the fuser at a relatively cool temperature or, at least relative to the heat within the fuser interior. This eliminates the prospect of the belt 655 becoming a heat sink for the heat being absorbed by the sheet as it enters and becomes attached to the belt. The other function of the heating means produced by the lamp 680 is to provide heat by way of conduction to the toner image on the sheet of paper.

With the toner image now completely fused by the combined action of the convection air produced by the coil 666 and the impeller 664 and the irradiated heat produced by the lamps 672 and, with the aid of the heat produced by conduction on the belt 655 by the lamp 680, the sheet is now conveyed through a rear opening slot 683 formed in the rear wall of the housing 651. In leaving the fuser assembly 21, the sheet of paper may be conducted by a short running conveyor system to a suitable output tray.

During continuous operation of the fuser apparatus 21, the motor M-5 remains continuously energized in order to continuously impart rotation to the impeller 664. Continuous movement of the belt 655 is maintained by a drive system (not shown) connected to the shaft 660. Air is continuously circulated throughout the entire fuser housing 650 by virtue of the rotation of the impeller 664. The air that is directed through the opening 668 is expanded as it enters the chamber 667 and impinges upon the toner image on the sheet of paper W. The air is then directed upwardly through and around the conveyor belt 665 and the rollers 656, 657 and conveyed back to the space below the impeller 664 and into the interior space thereof by means of a duct 687 (see FIG. 7) which is in communication with the upper regions of the interior of the housing 655 and with a chamber 688 formed in the lower section of the lower housing 652 below the lower end of the impeller as indicated by the flow arrows. This movement of air creates the previously described vacuum conditions in the plenum chamber 662 and the vacuum, in conjunction with the upward flow of air from the chamber 663, maintains each sheet of paper entering the fuser assembly against the conveyor belt 655 to permit movement thereby. Also, by maintaining a closed loop air flow pattern, that is, a re-heat recirculating system, high heating efficiency is achieved since there is relatively little heat loss and this may be made up by a substantially reduced heat input. In order to minimize the time in bringing the temperature within the fuser assembly to a predetermined optimum valve, the entry slit 653 for the housing 650 through which sheets of paper are conveyed by the transport 16 and the exit slit 683 are provided with gates 695, 696 respectively which are adapted to close their respective slots during the warm-up period for the reproduction machine. A solenoid SOL-3 is connected to each gate for actuating the same upon the reception of control signals from a suitable control circuit arranged to control closing of the gates during the time the reproduction machine, in which the fuser assembly 21 is employed, is in a warmup mode and before actual use of the fuser assembly is effected.

While there is in this application specifically described one form which the invention may assume in practice, it will be understood that this form of the same is shown for purposes of illustration, and that the invention may be modified and embodied in various other forms.

What is claimed is:

1. A heat fixing apparatus for fixing electroscopic heat fusible material in particulate form carried on a support material including
   a housing,
   means for directing the support material through the housing,
   a heat generating device arranged in the housing and adapted to direct heated air flow to successively moving portions of the support material as the same moves in the interior of the housing,
   guide means arranged in said housing and operatively associated with said heat generating device, said guide means being arranged to direct air flow from the vicinity of the successively heated portions of the support material and into operative association with said heat generating device whereby air flow is continuously recirculated during a fixing operation, wherein said means for directing the support material is a conveying mechanism arranged wholly within the housing and adapted to engage and to convey the material through the housing, and including means for effecting at least a slight force upon the support material relative to said conveying mechanism for insuring movement of the material thereby, said force being produced by some of the air flow being directed from said portions to said heat generating means.

2. A heat fixing apparatus for fixing electroscopic heat fusible material in powder form carried on a support material including
   a housing,
   means for directing the support material through the housing,
   first heating device arranged in the housing and adapted to generate and direct heated air upon successively moving portions of the support material as the same travels through a first heating zone in the housing,
   second heating means arranged in said housing and adapted to produce radiant heat energy and to heat the support material by radiated heat at a second heating zone after the material has traveled through said first heating zone.

3. The apparatus of claim 2 including means associated with said first heating device for directing some of the air flow therefrom into communication with said second heating means to cooperate therewith in heating the support material traveling through the second heating zone.

4. The apparatus of claim 2 wherein the means for directing the support material is arranged in the housing for conveying the support material from said first heating zone to said second heating zone.

5. The apparatus of claim 2 including air conveying means arranged for directing the flow of air from said first heating zone back to said first heating device.

6. The apparatus of claim 2 including a third heating device arranged for heating the support material by conduction.

7. A heat fixing apparatus for fixing electroscopic heat fusible material in powder form carried on a support material including
    a housing,
    means for directing the support material through the housing,
    a heating device mounted in the housing,
    a recirculating air system positioned in the housing and arranged for producing air flow in one path from said heating device to successively moving portions of the support material as the same travels in the interior of the housing and, in another path from said portions to said heating device thereby providing continuous recirculating path of air movement,
    said housing being formed with an opening on one side thereof for permitting the movement of the material into the housing and another opening in another side for permitting the movement of the material out of the housing,
    closure means for each of said openings and control means for actuating said closure means into closing position relative to the openings when said heating device is in operation and support material is not present in the housing.

References Cited

UNITED STATES PATENTS

| | | | |
|---|---|---|---|
| 3,219,799 | 11/1965 | Trumbull et al. | 219—388 |
| 3,397,303 | 8/1968 | Smith | 34—1 XR |

JOHN J. CAMBY, Primary Examiner

U.S. Cl. X.R.

219—388